(12) United States Patent
Zhao

(10) Patent No.: US 7,999,050 B2
(45) Date of Patent: Aug. 16, 2011

(54) PROCESS FOR PRODUCTION OF POLYMER DISPERSIONS CONTAINING AN ACETOACETATE MOIETY

(75) Inventor: Cheng-Le Zhao, Northville, MI (US)

(73) Assignee: BASF SE, Wyandotte, MI (US)

( * ) Notice: Subject to any disclaimer, the term of this patent is extended or adjusted under 35 U.S.C. 154(b) by 643 days.

(21) Appl. No.: 11/502,500

(22) Filed: Aug. 10, 2006

(65) Prior Publication Data

US 2007/0191521 A1 Aug. 16, 2007

Related U.S. Application Data

(63) Continuation of application No. 10/733,895, filed on Dec. 10, 2003, now abandoned.

(51) Int. Cl.
*C08F 2/00* (2006.01)
*C08F 4/00* (2006.01)
*C08F 30/08* (2006.01)
*C08F 26/00* (2006.01)
*C08F 20/06* (2006.01)
*C08F 20/10* (2006.01)

(52) U.S. Cl. ........ 526/207; 526/233; 526/236; 526/318; 526/279; 526/303.1; 526/287; 526/317.1

(58) Field of Classification Search .................. 526/910, 526/911, 207, 233, 236, 318, 279, 303.1, 526/287, 317.1, 298
See application file for complete search history.

(56) References Cited

U.S. PATENT DOCUMENTS 5,534,310 A * 7/1996 Rokowski et al. ............ 427/494
* cited by examiner

*Primary Examiner* — William K Cheung
(74) *Attorney, Agent, or Firm* — Harness, Dickey & Pierce, P.L.C.

(57) ABSTRACT

A method of making a composition comprising reacting, in a reactor, a non-halogenated acetoacetate group containing monomer, at least one additional monomer, and a base, wherein at least a portion of the base is fed to the reactor during reaction. Also, a composition comprising an aqueous polymer dispersion that is a product of a method comprising reacting a non-halogenated acetoacetate moiety containing monomer, at least one additional monomer, and a base, wherein the base is fed to the reaction during reaction, wherein the composition has a lower viscosity than a second composition, wherein the second composition is prepared from the same materials as the composition, and the second composition is made by a method wherein the base is added to the second composition after a reaction to form the second composition.

15 Claims, No Drawings

PROCESS FOR PRODUCTION OF POLYMER DISPERSIONS CONTAINING AN ACETOACETATE MOIETY

This U.S. Patent application is a Continued Application of Ser. No. 10/733,895, filed Dec. 10, 2003, which has been abandoned.

BACKGROUND

Acetoacetate moieties in polymers have been used to make crosslinkable polymers. These polymers are useful in coatings. Generally, the polymers are prepared from monomer mixtures that contain a monomer with an acetoacetate moiety. After the polymer is formed, the polymer is neutralized with a base.

These polymers are often associated with a high viscosity. Higher viscosities increase the difficulty of manufacture and transportation of the polymers. Lower viscosities are generally desirable for reasons of heat transfer and energy consumption during manufacturing. Also, lower viscosities allow for easier pumping and handling. Decreased viscosities also allow for increased solids contents, which is desirable in transportation in that less water has to be shipped.

It would be desirable to make an acetoacetate moiety containing polymer with a lower viscosity.

SUMMARY

The present disclosure relates to a method of making a composition comprising reacting, in a reactor, a non-halogenated acetoacetate group containing monomer, at least one additional monomer, and a base, wherein at least a portion of the base is fed to the reactor during reaction.

The present disclosure also relates to a composition comprising an aqueous polymer dispersion that is a product of a method comprising reacting a non-halogenated acetoacetate moiety containing monomer, at least one additional monomer, and a base, wherein the base is fed to the reaction during reaction, wherein the composition has a lower viscosity than a second composition, wherein the second composition is prepared from the same materials as the composition, and the second composition is made by a method wherein the base is added to the second composition after a reaction to form the second composition, and wherein the at least one additional monomer is not butadiene.

DETAILED DESCRIPTION

As used throughout, ranges are used as a shorthand for describing each and every value that is within the range. Any value within the range can be selected as the terminus of the range.

A composition is prepared by reacting a non-halogenated acetoacetate moiety containing monomer, at least one additional monomer, and a base, wherein the base is fed to the reaction. The composition of the present disclosure is prepared as an aqueous polymer dispersion. The composition has a lower viscosity than a second composition prepared from the same materials as the composition, wherein the second composition is made by a method wherein the base is added to the second composition after a reaction to form the second composition. By changing the point at which a base is added, a different composition is formed. The difference can be seen in the viscosity of the compositions. The composition of the present disclosure will have a lower viscosity than the second composition. Also, when the composition is included in a coating composition and tested for scrub resistance according to ASTM D-2486, the composition will have a higher scrub resistance as compared to the second composition.

The base is fed to the reaction while the monomers are reacting. A portion of the total base can be provided in the reactor prior to the start of reaction. Preferably, less than 50% of the total amount of base is present in the reactor at the start of the reaction. More preferably, none of the base is present in the reactor at the start of reaction. The base can be present with the monomers as the monomers are fed to the reactor, or the base can be fed from a separate feed, or a combination of both. In a preferred embodiment, the base is fed with the monomers.

The bases that are suitable for use in the present disclosure include those substances by the following three definitions: (1) a compound that dissociates on solution in water to produce one or more hydroxyl ions; (2) any compound which can accept a proton by a more general definition according to the Brönsted concept and (3) anything which has an un-shared pair of electrons according to a still more general concept of G. N. Lewis. Within the scope of the three definitions, the class of compounds that are commonly used in preparing buffers are also included and can be used. A buffer is a solution of a compound that has the capability of minimizing changes in proton (hydrogen ion) concentration.

General examples of the base include, but are not limited to, alkali metal hydroxides, alkaline earth metal hydroxides, hydroxides of elements from Groups 7 through 13 in the periodic table (IUPAC Nomenclature), ammonia, ammonium hydroxide, amines including primary amines, secondary amines, and tertiary amines such as, but not limited to, alkylamines, arylamines, and heterocyclic amines.

Preferred bases include, but not limited to, lithium hydroxide, sodium hydroxide, potassium hydroxide, magnesium hydroxide, calcium hydroxide, barium hydroxide, ammonia, ammonium hydroxide, alkylamines such as methylamines, ethylamines, propylamines, dimethylamines, diethylamines, trimethylamines, and triethylamines, 2-amino-2-methyl-1-propanol, triethanolamine, compounds with buffering capabilities such as carbonates and bicarbonates of alkali metals (preferably lithium, sodium, or potassium), ammonium carbonate, ammonium bicarbonate, mono- and dibasic phosphates of alkali metals, ammonium mono- and dibasic phosphates, tetroxalates and tartrates of alkali metals, ammonium tetroxalate, ammonium tartrate, phthalates of alkali metals, and ammonium phthalate.

Depending upon the types and amounts of monomers, the amount of base is selected so that undesired results are minimized or avoided. For example, if esters of (meth)acrylic acid are used, too much base can lead to excessive hydrolysis of the monomers. Also, too much base can drive monomers with acid groups to the aqueous phase and reduce the amount of the acid groups attached covalently to the particles, which can decrease the stability of the polymer particles.

In a preferred embodiment, the base is added during the reacting step in an amount to provide a pH that is at least 0.2 units higher than would be obtained if the base were not used. In another preferred embodiment, the base is added during the reacting step in an amount such that the pH is not higher than 7. In another preferred embodiment, the base is added during the reacting step in an amount to provide a pH that is at least 0.2 units higher than would be obtained if the base were not used, and the base is added during the reacting step in an amount such that the pH is not higher than 7. In another preferred embodiment, the base is used in an amount of from about 0.01 to about 2 weight % based on a total weight of the polymer.

A non-halogenated acetoacetate moiety has the following general structure:

—$R_1$—C(O)—$CH_2$—X, where $R_1$ is a divalent organic radical at least three atoms in length, X is organoacyl [—C(O)—$R_2$] or cyano [—CN], wherein $R_2$ is a methyl group [—$CH_3$] or a monovalent organic radical, and there is no halogen atom on the carbon atom between the two carbonyl carbon atoms. Examples of acetoacetate moiety containing monomers can be found in U.S. Pat. No. 3,459,790, which is incorporated herein by reference. Preferred ethylenically-unsaturated acetoacetate moiety containing monomers include, but are not limited to, 2-acetoacetoxyethyl(meth)acrylate, 3-acetoacetoxypropyl (meth)acrylate, 4-acetoacetoxybutyl (meth)acrylate, 2-cyanoacetoxyethyl (meth)acrylate, 3-cyanoacetoxypropyl(meth)acrylate, 4-cyanoacetoxybutyl (meth)acrylate, N-(2-acetoacetoxyethyl) (meth)acrylamide, allyl acetoacetate, 2,3-di(acetoacetoxy)propyl(meth)acrylate, vinyl acetoacetate, and combinations thereof.

In a preferred embodiment, the non-halogenated acetoacetate moiety containing monomer is present in an amount from about 0.1 to about 25 weight % based on a total weight of the polymer.

The at least one additional monomer makes up that balance of the monomers. In a preferred embodiment, the at least one additional monomer is present in an amount from about 70 to about 99.9 weight % based on a total weight of the polymer.

The at least one additional monomer suitable for the reaction products of the present disclosure include all monomers that can be reacted with an acetoacetate moiety containing monomer to form an aqueous dispersion polymer. Such monomers can be any ethylenically unsaturated monomer that can be polymerized by a free-radical mechanism. Examples of these monomers can be found in U.S. Patent Application Publication No. 2003/0195297, which is incorporated herein by reference. Suitable examples of the at least one additional monomer include, but are not limited to, (meth)acrylates, hydroxyl containing (meth)acrylates, vinyl aromatics, vinyl halides, vinylidene halides, esters of vinyl alcohol and $C_1$-$C_{18}$ monocarboxylic acids, esters of allyl alcohol and $C_1$-$C_{18}$ monocarboxylic acids, ethylenically unsaturated monomers containing at least one carboxylic acid group, salts of ethylenically unsaturated monomers containing at least one carboxylic acid group, anhydrides of ethylenically unsaturated dicarboxylic acids, nitriles of ethylenically unsaturated carboxylic acids, ethylenically unsaturated monomers containing at least one sulfonic acid group, salts of ethylenically unsaturated monomers containing at least one sulfonic acid group, ethylenically unsaturated monomers containing at least one amide group, dienes, alkyds, nitrogen-containing adhesion monomers, glycidyl esters of ethylenically unsaturated monomers, vinyl esters of the formula $CH_2$=CH—O—(CO)—C—$(R_{100})_3$ wherein $R_{100}$ is an alkyl (sold under the trade name VEOVA™ by Shell), alkylaminoalkyl group-containing (meth)acrylic monomers, alkyl esters of (meth)acrylic acid containing an ether bond in the alkyl, urethane esters of (meth)acrylic acid, urea esters of (meth)acrylic acid, vinyl monomers, isocyanate esters of (meth)acrylic acid, carbonyl containing monomers, monomers containing hydrolyzable Si-organic bonds, vinyl esters of neo acids (such as those sold under the trade name EXXAR™ NEO 10 and NEO 12 from Exxon), enamines, alkyl crotonates, phosphate (meth)acrylates, and (meth)acryloxy benzophenones.

The (meth)acrylates are reaction products of ethylenically unsaturated carboxylic acids and $C_1$-$C_{18}$ alcohols. Examples of (meth)acrylates include, but are not limited to, methyl (meth)acrylate, ethyl(meth)acrylate, propyl(meth)acrylate, n-butyl (meth)acrylate, isobutyl(meth)acrylate, t-butyl(meth)acrylate, pentyl(meth)acrylate, hexyl(meth)acrylate, cyclohexyl(meth)acrylate, benzyl(meth)acrylate, 2-ethylhexyl (meth)acrylate, heptyl(meth)acrylate, n-octyl(meth)acrylate, nonyl(meth)acrylate, decyl (meth)acrylate, undecyl(meth)acrylate, dodecyl(meth)acrylate, tridecyl(meth)acrylate, lauryl(meth)acrylate, stearyl(meth)acrylate, isobornyl(meth)acrylate, norbornyl (meth)acrylate, 4-tertbutylcyclohexyl (meth)acrylate, 3,3,5-trimethylcyclohexyl (meth)acrylate, dimethyl maleate, n-butyl maleate, alkylene glycol di(meth)acrylates, ethylene glycol di(meth)acrylate, 1,3-butylene glycol di(meth)acrylate, 1,4-butylene glycol di(meth)acrylate, propylene glycol (meth)acrylate, 1,6-hexanediol di(meth)acrylate, dipropylene glycol di(meth)acrylate, tripropylene glycol di(meth)acrylate, trimethylolpropane tri(meth)acrylate, cyclopentadienyl(meth)acrylate, carbodiimide(meth)acrylate, t-butylaminoethyl(meth)acrylate, 2-t-butylaminoethyl (meth)acrylate, and N,N-dimethylaminoethyl(meth)acrylate. The pendant group may contain one or more hetero atoms, aromatic groups, or ethylenic unsaturation.

Examples of hydroxyl containing (meth)acrylates include, but are not limited to, 2-hydroxyethyl(meth)acrylate, hydroxypropyl(meth)acrylates, and hydroxybutyl(meth)acrylates.

Examples of ethylenically unsaturated monomers containing at least one carboxylic acid group include, but are not limited to, (meth)acrylic acid, maleic acid, fumaric acid, itaconic acid, ethacrylic acid, crotonic acid, citraconic acid, cinnamic acid, phthalic acid, isophthalic acid, terephthalic acid, tetrahydrophthalic acid, hexahydrophthalic acid, tetrabromophthalic acid, trimellitic acid, pyromellitic acid, 1,4,5,6,7,7-hexachloro-5-norbornene-2,3-dicarboxylic acid, succinic acid, 2,6-naphthalenedicarboxylic acid, glutaric acid, sebacic acid, azelaic acid, 1,4-cyclohexanedicarboxylic acid, and 1,3-cyclohexanedicarbocylic acid.

Examples of anhydrides of ethylenically unsaturated dicarboxylic acids include, but are not limited to, maleic anhydride, succinic anhydride, phthalic anhydride, tetrahydrophthalic anhydride, hexahydrophthalic anhydride, tetrabromophthalic anhydride, trimellitic anhydride, pyromellitic anhydride, and 1,4,5,6,7,7-hexachloro-5-norbornene-2,3-dicarboxylic anhydride.

Examples of esters of ethylenically unsaturated monomers containing at least one carboxylic acid group include, but are not limited to, methyl hydrogen fumarate, benzyl hydrogen maleate, butyl hydrogen maleate, octyl hydrogen itaconate, dodecyl hydrogen citraconate, butyl fumarate, octyl fumarate, octyl maleate, dibutyl maleate, and dioctyl maleate.

Examples of esters of vinyl alcohol and $C_2$-$C_{18}$ monocarboxylic acids include, but are not limited to, vinyl acetate, vinyl acetoacetate, vinyl propionate, vinyl n-butyrate, vinyl heptanoate, vinyl perlogonate, vinyl 3,6-dioxaheptanoate, vinyl 3,6,9-trioxanundecanote, vinyl laurate, and vinyl stearate. Examples of esters of allyl alcohol and $C_1$-$C_{18}$ monocarboxylic acids include, but are not limited to, allyl acetate, allyl propionate, allyl(meth)acrylate, allyl n-butyrate, allyl laurate, allyl stearate, diallyl maleate, and diallyl fumarate.

Examples of suitable nitriles of ethylenically unsaturated carboxylic acids include, but are not limited to, acrylonitrile and methacrylonitrile. Examples of vinyl aromatics include, but are not limited to, styrene, α-methyl styrene, o-chlorostyrene, chloromethyl styrene, α-phenyl styrene, styrene sulfonic acid, salts of styrene sulfonic acid, para-acetoxystyrene, divinylbenzene, diallyl phthalate, vinyl toluene, and vinyl naphthalene. Examples of dienes include, but are not limited to, butadiene, isoprene, and chloroprene.

Examples of unsaturated monomers containing at least one sulfonic acid group include, but are not limited to, vinyl sulfonic acid, arylsulfonic acid, sulfopropyl acrylate, (Meth) acryloyloxynaphthalenesulfonic acid, 2-acrylamido-2-methylpropanesulfonic acid, and acryloyloxybenzenesulfonic acid.

Examples of unsaturated monomers containing at least one amide group include, but are not limited to, (meth)acrylamide, dimethyl(meth)acrylamide, N-alkyl (meth)acrylamide, N-butylacrylamide, tetramethylbutylacrylamide, N-alkylol (meth)acrylamide, N-methylol (meth)acrylamide, N-octyl acrylamide, methylene bis acrylamide, diacetoneacrylamide, ethyl imidazolidon (meth)acrylate, and N,N-dimethylaminopropylmethacrylamide.

As used throughout this specification and claims, nitrogen-containing adhesion monomers are free-radically polymerizable monomers that have at least one of an amino group, a ureido group, a urea group, a thiourea group, and a N-heterocyclic group. Examples of nitrogen-containing adhesion monomers include, but are not limited to, ureido (meth)acrylates, (meth)acrylates with at least one of urea and thiourea in the side chains, acrylic allophanes, aminoethyl acrylate and methacrylate, dimethylaminoethyl acrylate and methacrylate, diethylaminoethyl acrylate and methacrylate, dimethylaminopropyl acrylate and methacrylate, 3-dimethylamino-2,2-dimethylpropyl acrylate and methacrylate, 2-N-morpholinoethyl acrylate and methacrylate, 2-N-piperidinoethyl acrylate and methacrylate, N-(3-dimethylaminopropyl)acrylamide and -methacrylamide, N-dimethylaminoethylacrylamide and -methacrylamide, N-diethylaminoethylacrylamide and -methacrylamide, N-(4-morpholinomethyl)acrylamide and -methacrylamide, vinylimidazole and also monoethylenically unsaturated derivatives of ethyleneurea, such as N-(2-(meth)acryloyloxyethyl)ethyleneurea, N-(β-acrylamidoethyl)ethyleneurea, N-2-(allylcarbamato)aminoethylimidazolidinone, N-vinylethyleneurea, N-(3-allyloxy-2-hydroxypropyl)aminoethylethyleneurea, N-vinyloxyethyleneurea, N-methacryloyloxyacetoxyethylethyleneurea, N-(acrylamidoethylene)ethyleneurea, N-(methacrylamidoethylene)-ethyleneurea, 1-(2-methacryloyloxyethyl)imidazolin-2-one, and N-(methacrylamidoethyl)ethyleneurea.

Examples of carbonyl-containing monomers include, but are not limited to, acrolein and methacrolein.

Examples of the monomers containing hydrolyzable Si-organic bonds include, but are not limited to, vinyl silanes, methacryloyloxypropyltrimethoxysilane, methacryloyloxypropyltriethoxysilane, methacryloyloxypropyltripropxysilane, methacryloyloxypropyltriisopropxysilane, vinyltrimethoxysilane, vinyl tris(2-methoxyethoxy silane), and vinyl triisopropoxysilane.

Examples of the phosphate (meth)acrylates include, but are not limited to, sodium phosphate (meth)acrylate, alkylester phosphate (meth)acrylate, and ethoxylated alkylester phosphate (meth)acrylate.

Other vinyl monomers include, but are not limited to, 1,4-butanediol bisacrylate, vinyl acetoacetamide, vinyl 1,3-diketone, vinyl pyrrolidone, vinyl pyridine, vinyl pyrazine, vinyl piperadiene, vinyl piperidone, vinyl pyrimidine, vinyl pyrrole, vinyl imidazole, vinyl caprolactam, vinyl oxazole, vinyl thiazole, vinyl morpholine, triallyl cyanurate, glycidyl(meth)acrylate, 3-isopropenyl-α-α-dimethylbenzyl isocyanate, ethylene, and propylene.

In a preferred embodiment, the majority of the at least one additional monomer is not a functional monomer. A functional monomer is a monomer that has a functional group in addition to a carbon-carbon double bond or has at least two sites of ethylenic unsaturation. Functional groups include, but are not limited to, acids, hydroxyls, amides, nitrogen containing groups (such as those in the nitrogen-containing adhesion monomers listed above), silanes. Preferably, the functional monomers in this embodiment are present in an amount from about 0.05 to about 5% by weight based on a total weight of the polymer.

Examples of functional monomers are given above. Preferred functional monomers include, but are not limited to, mono-ethylenically unsaturated acids and diacids, such as acrylic acid, methacrylic acid, itaconic acid, and maleic acid; nitrogen-containing monomers such as acrylamide, methacrylamide, ureido (meth)acrylate, and ureido (meth)acrylamide; AMPS (acrylamidomethypropylsufonic acid or its salts); silane monomers such as methacryloxypropyl trimethoxysilane, methacryloxypropyl triethoxysilane, methacryloxypropyl tripropoxysilane, vinyltrimethoxysilane, and vinyltriethoxysilane; crosslinkers with two or more sites of ethylenic unsaturation, such as ethylene glycol dimethacrylate, diethylene glycol dimethacrylate, trimethylolpropane trimethacrylate, 1,3-butyleneglycol dimethacrylate, and 1,4-butyleneglycol dimethacrylate; ethoxylated vinyl or (meth) acrylic monomers such as PLURIOL® A010R (commercially available from BASF AG),

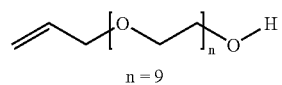

n = 9 and BOSOMER™ MPEG 350 MA (commercially available from Laporte),

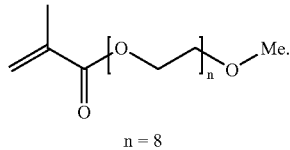

n = 8

In the above monomers, references are made to various acids or salts of these acids. When listed, the reference to the acid also includes a reference to its salts. The salts of theses acids include alkali metal salts, alkaline earth metal salts, and ammonium salts.

The polymers of the present disclosure can be made in a seedless semi-batch polymerization, an in-situ seeded semi-batch polymerization, a seeded semi-batch polymerization, or a continuous polymerization. In these polymerizations, the polymers of the present disclosure can be made as a single stage polymer, a gradient or power-feed polymer, or they can be made as a multiple stage polymer.

The reaction to form the polymers of the present disclosure can be an emulsion polymerization reaction in which the monomers are emulsified in water with a surface active agent or stabilized by a protective colloid and reacted using emulsion polymerization techniques known in the art. The resulting product of the emulsion polymerization is an aqueous polymer dispersion, also known as a latex.

The reaction can be started with any initiator. In the reaction, additional materials that are used in emulsion polymerizations can be included. Examples of additional materials include, but are not limited to, electrolytes, chelating agents, dispersing agents, chain transfer agents, and additional seed polymer particles. At the end of the reaction, typically a redox system, which includes an oxidizing agent and a reducing agent, is added to the reaction product to drive the reaction to further completion to reduce the amount of residual monomers. Alternatively, any system that reduces residual monomer content can be used. Examples include, but are not limited to, stripping with steam, vacuum, use of adsorbent materials, and combinations thereof.

Any temperature that allows the monomers to react to form a polymer can be used as a reaction temperature. Generally, emulsion polymerization reactions have a reaction temperature that ranges from about 3° C. to about 130° C.

Examples of surface active agents (surfactants) that can be used in the present disclosure include anionic, cationic, nonionic, amphoteric surfactants, and mixtures thereof.

Examples of anionic surfactants include, but are not limited to, organosulfates and sulfonates, e. g., sodium and potassium alkyl, aryl, and arylalkyl sulfates and sulfonates, such as sodium 2-ethylhexyl sulfate, potassium 2-ethylhexyl sulfate, sodium nonyl sulfate, sodium lauryl sulfate, potassium methylbenzene sulfonate, sodium dodecylbenzene sulfonate, potassium toluene sulfonate, and sodium xylene sulfonate; higher fatty alcohols, e. g., stearyl, lauryl, etc., which have been ethoxylated and sulfonated; dialkyl esters of alkali metal sulfosuccinic acid salts, such as sodium diamyl sulfosuccinate, sodium dioxtyl sulfosuccinate, and sodium dioctyl sulfosuccinate, formaldehyde-naphthalene sulfonic acid condensation products; and alkali metal salts, partial alkali metal salts, free acids of complex organic phosphate esters, and sodium salt of a fatty alcohol ether sulfate (EMULPHOR™ FAS 30 from BASF AG or DISPONIL™ FES 77 from Cognis, Inc.).

Examples of cationic surfactants include, but are not limited to, alkylamine salts such as laurylamine acetate, quaternary ammonium salts such as lauryl trimethyl ammonium chloride and alkyl benzyl dimethylammonium chlorides, and polyoxyethylenealkylamines.

Examples of amphoteric surfactants include, but are not limited to, alkylbetaines such as lauryl-betaine.

Examples of nonionic surfactants include, but are not limited to, polyethers, e. g., ethylene oxide and propylene oxide condensates that include straight and branched chain alkyl and alkylaryl polyethylene glycol and polypropylene glycol ethers and thioethers; alkylphenoxypoly(ethyleneoxy) ethanols having alkyl groups containing from about 7 to about 18 carbon atoms and having from about 4 to about 240 ethyleneoxy units, such as heptylphenoxypoly(ethyleneoxy) ethanols, nonylphenoxypoly(ethyleneoxy) ethanols; the polyoxyalkylene derivatives of hexitol including sorbitans, sorbides, mannitans and mannides; partial long-chain fatty acids esters, such as the polyoxyalkylene derivatives of sorbitan monolaurate, sorbitan monopalmitate, sorbitan monostearate, sorbitan tristearate, sorbitan monooleate and sorbitan trioleate; the condensates of ethylene oxide with a hydrophobic base, the base being formed by condensing propylene oxide with propylene glycol; sulfur containing condensates, e. g., those prepared by condensing ethylene oxide with higher alkyl mercaptans, such as nonyl, dodecyl, or tetradecyl mercaptan, or with alkylthiophenols wherein the alkyl group contains from about 6 to about 15 carbon atoms; ethylene oxide derivatives of long-chain carboxylic acids, such as lauric, myristic, palmitic, or oleic acids or mixtures of acids, such as tall oil fatty acids; ethylene oxide derivatives of long-chain alcohols such as octyl, decyl, lauryl, or cetyl alcohols; and ethylene oxide/propylene oxide copolymers sold under the tradename PLURONIC™ from BASF AG. Another nonionic surfactant is an organosilanol derivative of tung oil, or linseed oil, or high erucic acid rapeseed oil. These surfactant compositions particularly feature high surface activity in forming stable emulsions of organic/water of various difficult to emulsify materials as compared with conventional emulsifying agents. These silanol-based surfactant compositions are described in U.S. Pat. No. 5,807,922.

Another class of surfactants that can be used are those that are copolymerizable with the monomers described above.

In emulsion polymerization, the amount of surfactants in the emulsion polymerization reaction range from about 0.01 to about 10 weight percent, preferably about 0.2 to about 5 weight percent based on the total weight of monomers and water.

Initiators that can be used in a reaction to prepare the polymers of the present disclosure can be an oxidizer alone or a redox pair of oxidizing and reducing agents. Oxidizers that can be used alone or in the redox system include, but are not limited to, peroxides such as t-butyl hydroperoxide, hydrogen peroxide, pinane hydroperoxide, dibenzoyl peroxide, cumol hydroperoxide, persulfates such as peroxodisulfuric acid, salts of peroxodisulfuric acid, azo compounds such as azobisisobutyronitrile, agents that donate oxygen with free radical formation, alkali metal chlorates, alkali metal perchlorates, transition metal oxide compounds, potassium permaganate, manganese dioxide, lead oxide, lead tetraacetate, iodobenzene. Reducing agents that can be included in the redox system include, but are not limited to, sodium formaldehyde sulfoxylate, erythorbic acid, bisulfites, sodium metabisulfite, sodium bisulfite, adducts of a 3 to 8 carbon ketone with the bisulfite ion, adducts of a 3 to 8 carbon ketone with sulfurous acid, reducing sugars, ascorbic acid, sulfinic acids, hydroxymethane-sulfinic acid, alkane sulfinic acids, isopropane sulfinic acid. Additional redox systems are described in U.S. Pat. No. 5,994,457, which is incorporated herein by reference.

Additional polymers that can be blended with the polymer compositions of the present disclosure include, but are not limited to, (meth)acrylates, styrenics, styrene-butadienes, polyurethanes, polyethers, polyesters, melamine-formaldehyde polymers, vinyl halides, vinylidene halides, poly(ethyleneimines), and poly(vinyl amines).

Before the addition of post reaction additives to prepare specific desired compositions, the reaction products (the aqueous polymer dispersions) of the present disclosure generally have a total solids content of from about 30% to about 70% and a pH from about 2 to about 7. The pH of the reaction products can be adjusted to above 7 if required using a pH adjusting agent as described below. The particle size can generally range from about 30 nm to about 1000 nm. The particle size distribution can be uni- or multi-modal.

The compositions of the present disclosure may further contain additional additives. The additives can be any additive that may be generally included with an emulsion polymerization reaction product or any additive that may be used to make a specific composition. Further additives include, but are not limited to, surfactants, wetting agents, protective colloids, fillers, coloring agents, antiseptics, biocides, dispersing agents, thickening agents, thixotropic agents, antifreezing agents, pH adjusting agents, corrosion inhibitors, ultraviolet light stabilizers, crosslinking promoters, and antioxidants.

Examples of surfactants and wetting agents include, but are not limited to, the surfactants listed above, sulfosuccinates, fluorinated surfactants, and silicone surfactants.

Examples of protective colloids are partially and fully hydrolyzed polyvinyl alcohol, hydroxyethyl cellulose, hydroxymethyl cellulose, ethylhydroxyethyl cellulose, carboxymethyl cellulose, ethoxylated starch derivatives, polyacrylic acid, alkali metal polyacrylates, polyacrylamide, poly(methyl vinyl ether/maleic anhydride), polyvinylpyrrolidone, water soluble starch, glue, gelatin, water soluble alginates, guar, gum arabic, and gum tragacanth. The amount of protective colloids used in the composition varies depending upon the intended application and generally ranges from about 0.1 weight percent to about 2 weight percent based on the total weight of the composition.

Examples of fillers include talc, calcium carbonate, diatomaceous earth, mica, kaolin, barium sulfate, magnesium carbonate, fumed silica, vermiculite, graphite, alumina, silica, and rubber powder. Coloring agents such as titanium dioxide and carbon black can also be used as the fillers. The amount of the filler generally ranges from about 5 weight percent to about 50 weight percent based on the total weight of the composition of the present disclosure.

Various organic pigments and inorganic pigments may be broadly used as the coloring agents, but non-toxic anticorrosive pigments are preferred. Examples of such pigments are phosphate-type anticorrosive pigments such as zinc phosphate, calcium phosphate, aluminum phosphate, titanium phosphate, silicon phosphate, and ortho- and fused phosphates of these; molybdate-type anticorrosive pigments such as zinc molybdate, calcium molybdate, calcium zinc molybdate, potassium zinc molybdate, potassium zinc phosphomolybdate and potassium calcium phosphomolybdate; and borate-type anticorrosive pigments such as calcium borate, zinc borate, barium borate, barium meta-borate and calcium meta-borate. Also, any color pigment, effect pigment, or color and effect pigment may be used. The amount of the coloring agent used may also be properly selected based on the end-use application of the compositions of the present disclosure.

Examples of the antiseptics are pyrrole compounds, imidazole compounds, thiazole compounds, pyridine compounds and organic halogen compounds. The amount of the antiseptic can be suitably selected, and is, for example, up to about 4 percent by weight based on the total weight (as solids content) of the composition.

Examples of the biocides, which are used either as wet-state protectors or as film protectors of a coating composition, are a wide variety of bactericides, fungicides or algicides, and include, but are not limited to, zinc oxide, cuprous oxide, organotin pigments, copolymers of organotin esters of methacrylic acid with acrylates, tributyl tin oxide, and mixtures thereof. Other examples of biocides particularly useful as wet-state protectors are oxazoladines, organosulfurs, and benzisothiazolins. Any general toxic agent may be suitable as a biocide.

The dispersing agents include, but are not limited to, sodium salts of polycarboxylic acids, sodium or ammonium salts of fused naphthalene sulfonate, polyoxyalkylene alkyl ethers of phenol ether, sorbitan fatty acid esters, polyoxyalkylene fatty acid esters, glycerin fatty acid esters, polyoxyethylene styrene phenol, sodium tripolyphosphate and sodium hexametaphosphate. As described above, organosilanol derivatives of tung oil, or linseed oil, or high erucic acid rapeseed oil that are useful as surfactants are also suitable as dispersing agents. The amount of the dispersing agent generally ranges up to about 10 weight percent based on the total weight of the composition.

The thickening and thixotropic agents may be one and the same or different and may be the same as the protective colloids referred to above. Examples of thickening or thixotropic agents are polyvinyl alcohol, cellulose derivatives such as hydroxyethyl cellulose, hydroxypropyl cellulose and carboxymethyl cellulose salt, polyether compounds, urethane modified polyether compounds, polycarboxylic acid compounds, sodium salts of polycarboxylic compounds, polyvinylpyrrolidone, polyoxyethylene derivatives such as polyethylene glycol ether and polyethylene glycol disteratate, sodium alginate and inorganic materials such as sodium silicate and bentonite. The amounts of the thickening or the thixotropic agents can be properly chosen depending upon the type of end-application of the composition of the present disclosure.

Examples of the pH adjusting agents include, but are not limited to, sodium hydroxide, potassium hydroxide, sodium hydrogen carbonate, ammonium hydroxide, ammonia, amines, triethanolamine, and 3-dimethylaminoethanol. The amount of the pH adjusting agent is selected such that the composition has a desired pH.

Examples of the crosslinking promoters include, but are not limited to, carbodiimides.

Uses of the compositions of the present disclosure include, but are not limited to, coatings, including original equipment manufacture (OEM) automotive coatings, refinish automotive coatings, architectural coatings, paper coatings, textile coatings, industrial coatings, furniture coatings, powder coatings, graphic arts, inks, adhesives, binders, nonwovens, paper saturation, medical applications (such as dentifrice, sutures, and bandages), and construction chemicals.

One or more crosslinking agents or crosslinkers can be added to the polymer composition of the present disclosure when it is used alone, in a coatings formulation or in a blend with other polymer compositions. Polymer crosslinking provides chemical and stain resistance in coatings as well improved processability, toughness, and service life in other applications. All the chemical compounds known to crosslink with the acetoacetate moiety can be used to effect the crosslinking reaction. Examples of the crosslinking agents include, but not limited to, melamines, isocyanates, electron-deficient olefins, diamines, polyaldehydes. An overview of the various crosslinking possibilities of the acetoacetate moiety is given by Stacey J. Marsh and published in "The Acetoacetate Functionality", Proceedings of short course on Crosslinking for the Coatings Chemist, 2002 FSCT International Coatings Technology Conference.

When the polymer composition of the present disclosure is used alone, in a coatings formulation, or in a blend with other polymer compositions, it can be further crosslinked or cured by at least one of autooxidation and actinic radiation. When cured by actinic radiation, an actinic radiation curing agent can be included. Examples of actinic radiation curing agents include, but are not limited to, benzophenone, 4-methylbenzophenone, benzoyl benzoates, phenylacetophenones, 2,2-dimethoxy-2-phenylacetophenone, and amine modified diacrylates. The amount of actinic radiation curing agents that can be included in the compositions can be any amount that promotes or accelerates curing or hardening of the polymers. Generally, the amount of actinic radiation curing agents ranges from about 0% to about 1% based on the weight of the composition, and preferably from about 0% to about 0.5%.

In various embodiments of the present disclosure, a molecular weight reducing agent is added in an amount less than about 0.7 weight percent based on the total weight of the monomers present.

SPECIFIC EMBODIMENTS OF THE DISCLOSURE

The disclosure is further described in the following examples. The examples are merely illustrative and do not in any way limit the scope of the disclosure as described and claimed.

The viscosities of the polymer dispersions were measured throughout using a Brookfield Viscometer (Model RVDV-II+) with either spindle #2 at a speed of 50 rpm for viscosities below about 800 cps or spindle #3 at a speed of 50 rpm for viscosities higher than about 800 cps.

The preferred emulsion polymerization process is a semi-continuous one in which all or the bulk of the monomers are added over a period of time into the reactor during polymerization. A semi-continuous process may include semi-batch with starved or non-starved monomer feeding, gradient feeding, power feeding, one-stage, multi-stage, swelling polymerization etc. A seed can be used for better control of particle size and/or particle size distribution.

An amount of a 5% solution of ammonium persulfate initiator was prepared fresh and placed in a feeding vessel. Initiator was added to the polymerization reactor via a feed tube having a valve to control the feed rate.

To a stirred pre-emulsion vessel were added specified amounts of deionized (DI) water, seed, surfactants, etc. This mixture was agitated to create an emulsion. Additional monomer emulsions or monomer mixtures were optionally prepared in separate vessels and transferred to the pre-emulsion vessel as outlined in the accompanying description. The pre-emulsion vessel was connected to the polymerization reaction via a feeding line with a valve to control the rate of feed.

Feeding rates of monomer emulsion and initiator were computer-controlled so that exact amounts were delivered into the polymerization reactor. The temperature of the reactor was controlled by a thermostated water bath. Reactor contents were agitated at a sufficient speed so as to provide adequate mixing of reaction components. All reaction conditions are given in the tables below.

Abbreviations

MMA: methyl methacrylate

BA: n-butyl acrylate

AAEMA: 2-acetoacetoxyethyl methacrylate (from Eastman Chemical)

MAA: methacrylic acid

AA: acrylic acid

IA: itaconic acid

Comparative Example 1 (CE1)

MMA/BA/MEMA Copolymer Dispersion Without the Use of a Base During Polymerization A polymerization reactor was charged with 407.9 g of water, 10.0 g of PLURIOL® A010R monomer (BASF Corporation) and 47.1 g of a polystyrene seed latex (32.2% by weight; average particle diameter $d_{50}$=30 nm) and this initial charge was heated to 85° C. Then 3.0 g of a 5.0% strength by weight aqueous solution of ammonium persulfate were added in one portion into the reactor. Commencing simultaneously, the remaining initiator solution was added to the polymerization reactor over the course of 192 minutes and the Monomer Emulsion I was added over 144 minutes. The temperature was maintained at 85° C. After the end of the addition of Monomer Emulsion I, the continuous feed of Monomer Emulsion II was started immediately and lasted 24 minutes. After the end of the addition of Monomer Emulsion II, the reactor was maintained at 85° C. for 30 more minutes and then cooled down to 75° C. 6.43 g of a 28% strength by weight aqueous ammonia and 55 g of water were added. To further reduce the amount of residual monomers, the following chemical stripping process was applied: 21.67 g of a 4.62% strength by weight aqueous solution of t-butyl hydroperoxide and 21.67 g of a 6% strength by weight aqueous solution of sodium acetone bisulfite were fed separately and continuously into the reactor over 30 minutes. The reactor was maintained at 75° C. for 30 more minutes and then cooled down to room temperature. 20.36 g of a 28% strength by weight aqueous ammonia and 6.67 g of a 1.5% strength by weight aqueous solution of a biocide were added. The polymer dispersion was essentially free of coagulum, had a pH of 9.34, solids content of 49.96% by weight and a Brookfield viscosity of 2540 cps. The pH values during emulsion polymerizations were recorded. Table 1 summarizes pH values measured, final latex viscosity, and paint scrub resistance. The compositions of the monomer emulsions were as follows:

| Monomer Emulsion I | |
|---|---|
| 250.38 g | water |
| 33.33 g | emulsifier 1[1] |
| 15.63 g | emulsifier 2[2] |
| 13.16 g | emulsifier 3[3] |
| 10.00 g | MAA |
| 12.50 g | IA |
| 25.00 g | 50% strength by weight aqueous solution of acrylamide |
| 0.00 g | 10% strength by weight aqueous solution of sodium hydroxide |
| 40.00 g | AAEMA |
| 540.00 g | BA |
| 275.00 g | MMA |

| Monomer Emulsion II | |
|---|---|
| 111.67 g | of water |
| 33.33 g | of emulsifier 1[1] |
| 1.00 g | of tert-dodecyl mercaptan |
| 99.00 g | of MMA |

[1] Emulsifier 1: A 15% strength aqueous solution of sodium lauryl sulfate under the trade name of TEXAPON™ K12-15 from Cognis Corporation

[2] Emulsifier 2: A 33% strength aqueous solution of sodium lauryl ether sulfate, 30-EO moles under the trade name of DISPONIL™ FES 77 IS from Cognis Corporation

[3] Emulsifier 3: A 38% strength aqueous slurry of sodium aryl sulfonate, under the trade name of CALSOFT™ L-40S from Pilot Chemical Company Example 1 (E1)

MMA/NBA/AAEMA Copolymer Dispersion Prepared by Using a Base During Polymerization The polymerization recipe and process is similar to that of CE1, except NaOH was added into the Monomer Emulsion I. The compositions of Emulsion I and II are given below. After the emulsion polymerization and the chemical stripping processes, the polymer dispersion has been cooled down to room temperature, 17.32 g of a 28% strength by weight aqueous ammonia and the same amount of the biocide as in CE1 were added. The product was essentially free of coagulum, had a pH of 9.2, solids content of 50.10% by weight and a Brookfield viscosity of 690 cps. The pH values during emulsion polymerizations were recorded. Table 1 summarizes pH values measured, final latex viscosity, and paint scrub resistance.

The compositions of the monomer emulsions were as follows:

Monomer Emulsion I

| | | |
|---|---|---|
| 242.73 g | water | |
| 33.33 g | emulsifier 1 | |
| 15.63 g | emulsifier 2 | |
| 13.16 g | emulsifier 3 | |
| 10.00 g | MAA | |
| 12.50 g | IA | |
| 25.00 g | a 50% strength by weight aqueous solution of acrylamide | |
| 8.50 g | a 10% strength by weight aqueous solution of sodium hydroxide | |
| 40.00 g | AAEMA | |
| 540.00 g | BA | |
| 270.00 g | MMA | |

Monomer Emulsion II

| | |
|---|---|
| 111.67 g | water |
| 33.33 g | emulsifier 1 |
| 1.00 g | tert-dodecyl mercaptan |
| 99.00 g | MMA |

Example 2 (E2)

MMA/BA/AAEMA Copolymer Dispersion Prepared by Using a Base During Polymerization The polymerization recipe and process is similar to that of CE1, except NaOH was added into the Monomer Emulsion I. The compositions of Emulsion I and II are given below. After the emulsion polymerization and the chemical stripping processes, the polymer dispersion was cooled down to room temperature, 14.29 g of a 28% strength by weight aqueous ammonia and the same amount of the biocide as in CE1 were added. The product was essentially free of coagulum, had a pH of 9.29, solids content of 49.48% by weight and a Brookfield viscosity of 320 cps. The pH values during emulsion polymerizations were recorded. Table 1 summarizes pH values measured, final latex viscosity, and paint scrub resistance. The compositions of the monomer emulsions were as follows:

Monomer Emulsion I

| | | |
|---|---|---|
| 235.08 g | water | |
| 33.33 g | emulsifier 1 | |
| 15.63 g | emulsifier 2 | |
| 13.16 g | emulsifier 3 | |
| 10.00 g | MAA | |
| 12.50 g | IA | |
| 25.00 g | 50% strength by weight aqueous solution of acrylamide | |
| 17.00 g | 10% strength by weight aqueous solution of sodium hydroxide | |
| 40.00 g | AAEMA | |
| 540.00 g | BA | |
| 275.00 g | MMA | |

Monomer Emulsion II

| | |
|---|---|
| 111.67 g | water |
| 33.33 g | emulsifier 1 |
| 1.00 g | tert-dodecyl mercaptan |
| 99.00 g | MMA |

Paint Formulation and Evaluation:

The dispersions of Comparative Example CE1 and Examples E1 and E2 were all formulated into semi-gloss paints using the same formulation as in the following:

Semi Gloss Paint Formulation (with about 50 g/L VOC):

| Ingredient | Parts (g) |
|---|---|
| Semi Gloss Paint Formulation (with about 50 g/L VOC): | |
| Water | 65.9 |
| Ethylene glycol | 13.0 |
| NATROSOL ™ 330 Plus[1] | 1.0 |
| AMP ™-95[2] | 2.0 |
| Pigment dispersant[3] | 10.0 |
| Biocide[4] | 3.0 |
| Defoamer[5] | 2.0 |
| Extender A[6] | 50.0 |
| Extender B[7] | 25.0 |
| Thickner[8] | 24.0 |
| Titanium Dioxide Slurry[9] | 294.0 |
| Ground for 20 min. at 1000 RPM and then added the following constituents: | |
| Coalescent[10] | 2.0 |
| Defoamer[5] | 1.5 |
| Polymer Dispersion (50%) | 517.7 |
| Water | 61.6 |

[1] NATROSOL ™ 330 Plus thickener from Hercules Inc.
[2] AMP-95: Angus Chemical Comapany
[3] TAMOL ™ 731 dispersant from Rohm & Haas Comapany
[4] PROXEL ™ BD 20 biocide from Avecia Inc.
[5] DREWPLUS ™ L-475 defoamer from Ashland Speccialty Chemical
[6] BURGESS ™ 28 filler from Burgess Pigment
[7] MINEX ™ 7 filler from Unimin Specialty Minerals Corporation
[8] AQUAFLOW ™ NHS 310 flow control aid from Hercules Inc.
[9] TI-PURE ™ R 746 titanium dioxide pigment from E. I. DuPont de Nemours
[10] TEXANOL ™ solvent from Eastman Chemical Company The low-shear viscosities of the paints ranged from 100 to 117 K.U. (Krebs Units), whereas the high-shear viscosities ranged from 1.5 to 1.7 poises (measured according to ASTM D4287 and D562-81, respectively).

The scrub resistance of the paints was tested according to ASTM D-2486 using a "Gardner" scrub machine and the standardized scrub medium SC-2. The paints were applied with the help of a film applicator to the Leneta scrub panels with a wet thickness of about 175 μm. The draw-down films were dried in a climate-controlled room (50% Relative Humidity and 23° C.) for 7 days before the scrub test.

TABLE 1

|  | Neutralizing Agent | pH during Polymerization at different times* | | | | | Final Latex Viscosity (cps) | Scrub Resistance (cycles) |
|---|---|---|---|---|---|---|---|---|
|  |  | 0 min. | 15 min. | 30 min. | 60 min. | 120 min. |  |  |
| CE1 | No NaOH addition during polymerization | 3.46 | 2.95 | 2.90 | 2.94 | 3.14 | 2540 | 1220 |
| E1 | 0.085%** NaOH added during polymerization in Monomer Emulsion 1 | 3.61 | 3.56 | 3.63 | 3.79 | 3.91 | 690 | 2335 |
| E2 | 0.170%** NaOH added during polymerization in Monomer Emulsion 1 | 3.62 | 3.58 | 3.61 | 3.78 | 3.91 | 320 | 2950 |

*Time from the start of monomer emulsion feed in which different amount of NaOH was added. pH at 0 minute was the value before the start of emulsion feed;
**weight % of NaOH based on total weight of polymer.

The results in Table 1 indicate that: Examples E1 and E2 had higher pH values after the start of the monomer emulsion feeds (at time >0 minute) due to the use of NaOH during polymerization. The use of the base sodium hydroxide in monomer emulsion during emulsion polymerization resulted in significantly lower latex viscosity (CE1 vs. E1 and E2). Reduced latex viscosity is desirable for ease of manufacturing and transportation. The use of the base sodium hydroxide in monomer emulsion during emulsion polymerization resulted in significantly higher scrub resistance (CE1 vs. E1 and E2). High scrub resistance is a desirable property of latex paint.

Comparative Example 2 (CE2)

MMA/BA/AAEMA Copolymer Dispersion without the Use of a Base During Polymerization A polymerization reactor was charged with 407.9 g of water, 15.0 g of PLURIOL® A010R monomer (BASF Corporation) and 47.1 g of a polystyrene seed latex (32.2% by weight; average particle diameter $d_{50}$=30 nm) and this initial charge was heated to 85° C. Then 3.0 g of a 5.0% strength by weight aqueous solution of ammonium persulfate were added in one portion. Commencing simultaneously, the remaining initiator solution was added to the polymerization reactor over the course of 192 minutes and the Monomer Emulsion I was added over 144 minutes. The temperature was maintained at 85° C. After the end of the addition of Monomer Emulsion I, the continuous feed of Monomer Emulsion II was started immediately and lasted 24 minutes. After the end of the addition of Monomer Emulsion II, the reactor was maintained at 85° C. for 30 more minutes and then cooled down to 75° C. 6.43 g of a 28% strength by weight aqueous ammonia and 55 g of water were added. To further reduce the amount of residual monomers, the following chemical stripping process was applied: 21.67 g of a 4.62% strength by weight aqueous solution of t-butyl hydroperoxide and 21.67 g of a 6% strength by weight aqueous solution of sodium acetone bisulfite were fed separately and continuously into the reactor over 30 minutes. The reactor was maintained at 75° C. for 30 more minutes and then cooled down to room temperature. 20.36 g of a 28% strength by weight aqueous ammonia and 6.67 g of a 1.5% strength by weight aqueous solution of a biocide were added. The polymer dispersion was essentially free of coagulum, had a pH of 9.40, solids content of 49.78% by weight, and a Brookfield viscosity of 3030 cps. Some wet properties of the polymer dispersion and the scrub resistance of the semi-gloss paint based on the polymer dispersion are summarized in Table 2. The compositions of the monomer emulsions were as follows:

| Monomer Emulsion I | |
|---|---|
| 250.38 g | water |
| 33.33 g | emulsifier 1[1] |
| 15.63 g | emulsifier 2[2] |
| 13.16 g | emulsifier 3[3] |
| 10.00 g | MAA |
| 12.50 g | IA |
| 25.00 g | 50% strength by weight aqueous solution of acrylamide |
| 0.00 g | 10% strength by weight aqueous solution of sodium hydroxide |
| 40.00 g | AAEMA |
| 540.00 g | BA |
| 270.00 g | MMA |

| Monomer Emulsion II | |
|---|---|
| 11.67 g | of water |
| 33.33 g | of emulsifier 1[1] |
| 1.00 g | of tert-dodecyl mercaptan |
| 99.00 g | of MMA |

Example 3 (E3)

MMA/NBA/AAEMA Copolymer Dispersion Prepared by Using a Base During Polymerization The polymerization recipe and process is similar to that of CE2, except NaOH was added into the Monomer Emulsion I. The compositions of Emulsion I and II are given below. After the emulsion polymerization and the chemical stripping processes, the polymer dispersion was cooled down to room temperature, 17.32 g of a 28% strength by weight aqueous ammonia and the same amount of the biocide as in CE2 were added. The product was essentially free of coagulum, had a pH of 9.33, solids content of 49.56% by weight, and a Brookfield viscosity of 980 cps. Some wet properties of the polymer dispersion and the scrub resistance of the semi-gloss paint based on the polymer dispersion are summarized in Table 2.

The compositions of the monomer emulsions were as follows:

| Monomer Emulsion I | |
|---|---|
| 242.73 g | water |
| 33.33 g | emulsifier 1 |
| 15.63 g | emulsifier 2 |
| 13.16 g | emulsifier 3 |
| 10.00 g | MAA |
| 12.50 g | IA |
| 25.00 g | 50% strength by weight aqueous solution of acrylamide |
| 8.50 g | 10% strength by weight aqueous solution of sodium hydroxide |
| 40.00 g | AAEMA |
| 540.00 g | BA |
| 270.00 g | MMA |

| Monomer Emulsion II | |
|---|---|
| 111.67 g | water |
| 33.33 g | emulsifier 1 |
| 1.00 g | tert-dodecyl mercaptan |
| 99.00 g | MMA |

Comparative Example 3 (CE3)

MMA/BA/AAEMA Copolymer Dispersion without the Use of a Base During Polymerization The polymerization recipe and process is similar to that of E3, except no NaOH was added into the Monomer Emulsion I. Instead, the 8.50 g of a 10% aqueous solution of sodium hydroxide was added into the latex after the chemical stripping and cooling down steps. The final product was essentially free of coagulum, had a pH of 9.05, solids content of 49.53% by weight, and a Brookfield viscosity of 2420 cps. Some wet properties of the polymer dispersion are summarized in Table 2.

Example 4 (E4)

MMA/BA/AAEMA Copolymer Dispersion Prepared by Using a Base During Polymerization The polymerization recipe and process is similar to that of CE2, except NaOH was added into the Monomer Emulsion I. The compositions of Emulsion I and II are given below. After the emulsion polymerization and the chemical stripping processes, the polymer dispersion was cooled down to room temperature, 14.29 g of a 28% strength by weight aqueous ammonia and the same amount of the biocide as in CE2 were added. The product was essentially free of coagulum, had a pH of 9.20, solids content of 49.70% by weight, and a Brookfield viscosity of 390 cps. Some wet properties of the polymer dispersion and the scrub resistance of the semi-gloss paint based on the polymer dispersion are summarized in Table 2. The compositions of the monomer emulsions were as follows:

| Monomer Emulsion I | |
|---|---|
| 235.08 g | water |
| 33.33 g | emulsifier 1 |
| 15.63 g | emulsifier 2 |
| 13.16 g | emulsifier 3 |
| 10.00 g | MAA |
| 12.50 g | IA |
| 25.00 g | 50% strength by weight aqueous solution of acrylamide |
| 17.00 g | 10% strength by weight aqueous solution of sodium hydroxide |
| 40.00 g | AAEMA |
| 540.00 g | BA |
| 270.00 g | MMA |

| Monomer Emulsion II | |
|---|---|
| 111.67 g | water |
| 33.33 g | emulsifier 1 |
| 1.00 g | tert-dodecyl mercaptan |
| 99.00 g | MMA |

Comparative Example 4 (CE4)

MMA/BA/AAEMA Copolymer Dispersion without the Use of a Base During Polymerization The polymerization recipe and process is similar to that of E4, except no NaOH was added into the Monomer Emulsion I. Instead, the 17.0 g of a 10% aqueous solution of sodium hydroxide was added into the latex after the chemical stripping and cooling down steps. The final product was essentially free of coagulum, had a pH of 8.97, solids content of 49.63% by weight, and a Brookfield viscosity of 2188 cps. Some wet properties of the polymer dispersion are summarized in Table 2.

Paint Formulation and Evaluation

The dispersions of Comparative Examples CE2 through CE4, and Examples E3 and E4 were all formulated into semi-gloss paints using the same formulation as shown above. The low-shear viscosities of the paints ranged from 95 to 117 K.U. (Krebs Units), whereas the high-shear viscosities ranged from 1.35 to 1.68 poises (measured according to ASTM D 4287 and D 562-81, respectively). The draw-down films were prepared as described above and scrub test was performed according to ASTM D-2486.

TABLE 2

| | Neutralizing Agent NaOH | Latex Solids (%) | Latex Viscosity (cps) | Scrub Resistance (cycles) |
|---|---|---|---|---|
| Comparative Example 2 (CE2) | No NaOH addition during polymerization | 49.8 | 3030 | 1500 |
| Example 3 (E3) | 0.085%* NaOH added during polymerization in Monomer Emulsion 1 | 49.6 | 980 | 2330 |
| Comparative Example 3 (CE3) | 0.085%* NaOH added after the end of polymerization | 49.5 | 2420 | Not tested |
| Example 4 (E4) | 0.170%* NaOH added during polymerization in Monomer Emulsion 1 | 49.7 | 390 | 2660 |
| Comparative Example 4 (CE4) | 0.170%* NaOH added after the end of polymerization | 49.6 | 2190 | Not tested |

*weight % of NaOH based on total weight of copolymer.

The results in Table 2 indicate that the use of the base sodium hydroxide in monomer emulsion results in significantly lower latex viscosity than the case where no NaOH is used during emulsion polymerization (CE2 vs. E3 and E4). The viscosity of the latex is significantly lower when the base sodium hydroxide is used in emulsion feed during polymerization than when it is used after the polymerization (E3 vs. CE3, and E4 vs. CE4). The use of the base sodium hydroxide in monomer emulsion during emulsion polymerization results in significantly higher scrub resistance (CE2 vs. E3 and E4).

Example 5 (E5)

MMA/BA/AAEMA Copolymer Dispersion Prepared by Using Ammonium Hydroxide During Polymerization The polymerization recipe and process is similar to that of CE1, except ammonium hydroxide was added into the Monomer Emulsion I. The compositions of Emulsion I and II are given below. After the emulsion polymerization and the chemical stripping processes, the polymer dispersion was cooled down to room temperature, 14.29 g of a 28% strength by weight aqueous ammonia and the same amount of the biocide as in CE1 were added. The product was essentially free of coagulum, had a pH of 9.24, solids content of 49.89% by weight, and a Brookfield viscosity of 160 cps. Table 3 summarizes some properties of the wet latex the semi-gloss paint based on this latex. The compositions of the monomer emulsions were as follows:

| Monomer Emulsion I | |
|---|---|
| 246.01 g | water |
| 33.33 g | emulsifier 1 |
| 15.63 g | emulsifier 2 |
| 13.16 g | emulsifier 3 |
| 10.00 g | MAA |
| 12.50 g | IA |
| 25.00 g | 50% strength by weight aqueous solution of acrylamide |
| 6.07 g | 28% strength by weight aqueous solution of ammonium hydroxide |
| 40.00 g | AAEMA |
| 540.00 g | BA |
| 270.00 g | MMA |

| Monomer Emulsion II | |
|---|---|
| 111.67 g | water |
| 33.33 g | emulsifier 1 |
| 1.00 g | tert-dodecyl mercaptan |
| 99.00 g | MMA |

Example 6 (E6)

MMA/BA/AAEMA Copolymer Dispersion Prepared by Using Amp (2-Amino-2-Methyl-1-Propanol) During Polymerization The polymerization recipe and process is similar to that of CE1, except 2-amino-2-methyl-1-propanol was added into the Monomer Emulsion I. The compositions of Emulsion I and II are given below. After the emulsion polymerization and the chemical stripping processes, the polymer dispersion was cooled down to room temperature, 14.29 g of a 28% strength by weight aqueous ammonia and the same amount of the biocide as in CE1 were added. The product was essentially free of coagulum, had a pH of 8.94, solids content of 50.35% by weight, and a Brookfield viscosity of 930 cps. Table 3 summarizes some properties of the wet latex the semi-gloss paint based on this latex. The compositions of the monomer emulsions were as follows:

| Monomer Emulsion I | |
|---|---|
| 250.29 g | water |
| 33.33 g | emulsifier 1 |
| 15.63 g | emulsifier 2 |
| 13.16 g | emulsifier 3 |
| 10.00 g | MAA |
| 12.50 g | IA |
| 25.00 g | 50% strength by weight aqueous solution of acrylamide |
| 1.79 g | 95% strength by weight aqueous solution of 2-amino-2-methyl-1-propanol |
| 40.00 g | AAEMA |
| 540.00 g | BA |
| 275.00 g | MMA |

| Monomer Emulsion II | |
|---|---|
| 111.67 g | water |
| 33.33 g | emulsifier 1 |
| 1.00 g | tert-dodecyl mercaptan |
| 99.00 g | MMA |

Example 7 (E7)

MMA/BA/AAEMA Copolymer Dispersion Prepared by Using Potassium Hydroxide During Polymerization The polymerization recipe and process is similar to that of CE1, except KOH was added into the Monomer Emulsion I. The compositions of Emulsion I and II are given below. After the emulsion polymerization and the chemical stripping processes, the polymer dispersion was cooled down to room temperature, 14.29 g of a 28% strength by weight aqueous ammonia and the same amount of the biocide as in CE1 were added. The product was essentially free of coagulum, had a pH of 8.93, solids content of 50.23% by weight, and a Brookfield viscosity of 1550 cps. Table 3 summarizes some properties of the wet latex the semi-gloss paint based on this latex. The compositions of the monomer emulsions were as follows:

| Monomer Emulsion I | |
|---|---|
| 235.08 g | water |
| 33.33 g | emulsifier 1 |
| 15.63 g | emulsifier 2 |
| 13.16 g | emulsifier 3 |
| 10.00 g | MAA |
| 12.50 g | IA |
| 25.00 g | 50% strength by weight aqueous solution of acrylamide |
| 17.00 g | 10% strength by weight aqueous solution of potassium hydroxide |
| 40.00 g | AAEMA |
| 540.00 g | BA |
| 275.00 g | MMA |

| Monomer Emulsion II | |
|---|---|
| 111.67 g | water |
| 33.33 g | emulsifier 1 |
| 1.00 g | tert-dodecyl mercaptan |
| 99.00 g | MMA |

Paint Formulation and Evaluation

The dispersions of Comparative Examples CE1 and Examples E5 and E7 were all formulated into semi-gloss paints using the same formulation as shown above. The low-shear viscosities of the paints ranged from 93 to 121 K.U. (Krebs Units), whereas the high-shear viscosities ranged from 1.2 to 1.7 poises (measured according to ASTM D 4287 and D 562-81, respectively). The draw-down films were prepared as described above and scrub test was performed according to ASTM D-2486.

TABLE 3

| | Neutralizing Agent NaOH | Latex Solids (%) | Latex Viscosity (cps) | Scrub Resistance (cycles) |
|---|---|---|---|---|
| Comparative Example 1 (CE1) | No addition of a base during polymerization | 49.8 | 2540 | 1220 |
| Example 5 (E5) | 0.170%* $NH_4OH$ added during polymerization in Monomer Emulsion 1 | 49.9 | 160 | 3540 |
| Example 6 (E6) | 0.170%* AMP (2-amino-2-methyl-1-propanol) added during polymerization in Monomer Emulsion 1 | 50.4 | 930 | 1880 |
| Example 7 (E7) | 0.170%* KOH added during polymerization in Monomer Emulsion 1 | 50.2 | 1550 | 1610 |

*weight % of the base used based on total weight of copolymer.

The results in Table 3 indicate that in addition to sodium hydroxide, other bases, such as ammonium hydroxide, AMP, and potassium hydroxide, also reduce latex viscosity when used in monomer emulsion feeds during polymerization (CE1 vs. E5 through E7). Similarly to sodium hydroxide, ammonium hydroxide, AMP, and potassium hydroxide also improve scrub resistance of paint when used in monomer emulsion feeds during polymerization (CE2 vs. E5 through E7).

TABLE 4

| | Amount of molecular weight reducing agent* | Scrub Resistance | Freeze-Thaw Stability |
|---|---|---|---|
| Example 4 (E4) | 0.1 | 2260 | Passed 5 cycles |
| Example 4a (54a) | 0.3 | 2340 | Passed 5 cycles |
| Comparative Example 4b (E4b) | 0.7 | 690 | Failed on $3^{rd}$ cycle |
| Comparative Example 4c (E4c) | 1.0 | 490 | Failed on $3^{rd}$ cycle |

*weight % based on total weight of monomers.

The results in Table 4 indicate the influence of a molecular weight reducing agent, such as a mercaptan (e.g., tert-dodecyl mercaptan) into the polymer dispersions of the present disclosure. The polymerization recipe and process for Example E4a and Comparative Examples E4b and E4c is similar to that of E4, described above, except the amount of molecular weight reducing agent has been modified to illustrate its influence on mechanical properties. As indicated in Table 4, the higher the amount of molecular weight reducing agent that is added, the more negative the impact exists with two key paint properties, namely scrub resistance and freeze-thaw stability. Thus, in various embodiments of the present disclosure, a molecular weight reducing agent is added in an amount less than about 0.7 weight percent based on the total weight of the monomers present. In certain embodiments a molecular weight reducing agent is added in an amount less than about 0.3 weight percent based on the total weight of the monomers, more preferably less than about 0.1 weight percent, or even less than about 0.08 weight percent, based on the total weight of the monomers.

It should be appreciated that the present disclosure is not limited to the specific embodiments described above, but includes variations, modifications and equivalent embodiments defined by the following claims.

What is claimed is:

1. A method of making an aqueous polymer dispersion comprising reacting, in a reactor,
    a. a non-halogenated acetoacetate group containing monomer,
    b. at least one additional monomer,
    c. a base to neutralize the acidic monomer, and
    d. a molecular weight reducing agent in an amount less than about 0.7 weight percent based on the total weight of the monomers of a molecular weight reducing agent,
    wherein at least a portion of the base is fed to the reactor during reaction and less than 50% of the base is present in the reactor at the start of the reacting step, and wherein the base is added during the reacting step in an amount such that the pH is not higher than 7 and such that the aqueous polymer dispersion viscosity is lower than an aqueous polymer dispersion prepared in the same way but without the base added during the reacting step.

2. The method of claim 1, wherein one of:
    a. none of the base is present in the reactor at the start of the reacting step and the base is mixed with the monomers and is added during the reacting step,
    b. none of the base is present in the reactor at the start of the reacting step and the base is fed into the reactor separately from the monomers during the reacting step,
    c. none of the base is present in the reactor at the start of the reacting step and the base is fed into the reactor mixed with the monomers and separately from the monomers during the reacting step,
    d. less than 50% of the base is present in the reactor at the start of the reacting step and the remainder of the base is mixed with the monomers and is added during the reacting step,
    e. less than 50% of the base is present in the reactor at the start of the reacting step and the remainder of the base is fed into the reactor separately from the monomers during the reacting step, or
    f. less than 50% of the base is present in the reactor at the start of the reacting step and the remainder of the base is fed into the reactor mixed with the monomers and separately from the monomers during the reacting step.

3. The method of claim 1, wherein the base is at least one of an alkali metal hydroxide, an alkaline earth metal hydroxide, lithium hydroxide, sodium hydroxide, potassium hydroxide, calcium hydroxide, magnesium hydroxide, barium hydroxide, ammonia, ammonium hydroxide, an amine, methylamine, ethylamine, propylamine, dimethylamine, diethylamine, trimethylamine, triethylamine, 2-amino-2-methyl-1-propanol, and triethanolamine.

4. The method of claim 1, wherein the base is at least one of a compound with buffering capability, an alkali metal carbonate, an alkali metal bicarbonate, ammonium carbonate, ammonium bicarbonate, a monobasic phosphate, an ammonium dibasic phosphate, a tetroxalate of an alkali metal, a tartrate of an alkali metal, ammonium tetroxalate, ammonium tartrate, a phthalate of an alkali metal, and ammonium phthalate.

5. The method of claim 1, wherein the base is added during the reacting step in an amount to provide a pH that is at least 0.2 units higher than would be obtained if the base were not present.

6. The method of claim 1, wherein the base is used in an amount of from about 0.01 to about 2 weight % based on a total weight of the polymer.

7. The method of claim 1 further comprising reacting a functional monomer with the other monomers to form the polymer, wherein the at least one additional monomer is not a functional monomer, and wherein the functional monomer is a monomer that has at least one of a functional group in addition to a carbon-carbon double bond or has at least two sites of ethylenic unsaturation.

8. The method of claim 7, wherein the functional monomer is present in an amount from about 0.05 to about 5 weight % based on a total weight of the polymer.

9. The method of claim 8, wherein the functional monomer is at least one of a mono-ethylenically unsaturated acid, a mono-ethylenically unsaturated diacid, (meth)acrylic acid, itaconic acid, maleic acid, a nitrogen-containing monomer, (meth)acrylamide, ureido (meth)acrylate, ureido (meth)acrylamide, acrylamidomethylpropylsulfonic acid, a salt of acrylamidomethylpropylsulfonic acid, a silane monomer, methacryloxypropyl trimethoxysilane, methacryloxypropyl triethoxysilane, methacryloxypropyl tripropoxysilane, methacryloxypropyl triisopropoxysilane, vinyltrimethoxysilane, vinyltriethyoxysilane, a monomer with at least two sites of ethylenic unsaturation, ethylene glycol dimethacrylate, diethylene glycol dimethacrylate, trimethylolpropane trimethacrylate, 1,3-butyleneglycol dimethacrylate, 1,4-butyleneglycol dimethacrylate, an ethoxylated vinyl monomer, an ethoxylated

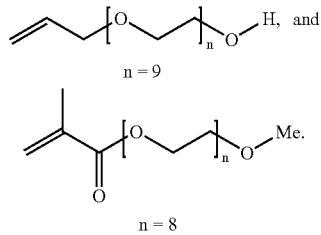

10. The method of claim 1, wherein the non-halogenated acetoacetate moiety containing monomer is present in an amount from about 0.1 to about 25 weight % based on a total weight of the polymer.

11. The method of claim 1, wherein the non-halogenated acetoacetate moiety containing monomer is at least one of 2-acetoacetoxyethyl(meth)acrylate, 2-cyanoacetoxyethyl (meth)acrylate, N-(2-acetoacetoxyethyl) (meth)acrylamide, 3-acetoacetoxypropyl(meth)acrylate, 4-acetoacetoxybutyl (meth)acrylate, 3-cyanoacetoxypropyl(meth)acrylate, 4-cyanoacetoxybutyl(meth)acrylate, allyl acetoacetate, 2,3-di(acetoacetoxy)propyl(meth)acrylate, and vinyl acetoacetate.

12. The method of claim 1, wherein the at least one additional monomer is present in an amount from about 70 to about 99.9 weight % based on a total weight of the polymer.

13. The method of claim 1, wherein the molecular weight reducing agent is provided in an amount less than about 0.3 weight percent based on the total weight of the monomers.

14. The method of claim 1, wherein the molecular weight reducing agent is provided in an amount less than about 0.1 weight percent based on the total weight of the monomers.

15. The method of claim 1, wherein the molecular weight reducing agent is provided in an amount less than about 0.08 weight percent based on the total weight of the monomers.

* * * * *